(12) United States Patent
Wolf

(10) Patent No.: US 7,805,882 B2
(45) Date of Patent: Oct. 5, 2010

(54) INVERTEBRATE CAPTURING DEVICE

(76) Inventor: Dane M. Wolf, 320 S. Ramsey St., Caledonia, MN (US) 55921

(*) Notice: Subject to any disclaimer, the term of this patent is extended or adjusted under 35 U.S.C. 154(b) by 0 days.

(21) Appl. No.: 11/414,931

(22) Filed: May 1, 2006

(65) Prior Publication Data

US 2006/0248786 A1 Nov. 9, 2006

Related U.S. Application Data

(60) Provisional application No. 60/678,846, filed on May 6, 2005.

(51) Int. Cl.
*A01M 1/06* (2006.01)
(52) U.S. Cl. .......................... 43/139; 43/133
(58) Field of Classification Search ............ None
See application file for complete search history.

(56) References Cited

U.S. PATENT DOCUMENTS

| | | | |
|---|---|---|---|
| 1,126,994 A * | 2/1915 | Harrison | 43/139 |
| 2,093,748 A * | 9/1937 | Becker | 15/353 |
| 2,346,339 A * | 4/1944 | Vose | 15/344 |
| 2,569,722 A * | 10/1951 | Knox | 43/139 |
| D173,181 S * | 10/1954 | Bill | D32/22 |
| 3,214,861 A * | 11/1965 | Arther | 43/139 |
| 3,231,997 A * | 2/1966 | Shugarman | 43/4 |
| 3,328,827 A * | 7/1967 | Lake et al. | 15/344 |
| 3,896,521 A | 7/1975 | Arthur | |
| 4,488,331 A | 12/1984 | Ward | 15/339 |
| 4,817,230 A * | 4/1989 | Kiyooka | 15/330 |
| 5,323,483 A | 6/1994 | Baeg | 388/811 |
| 5,367,821 A * | 11/1994 | Ott | 43/139 |
| 5,400,543 A * | 3/1995 | Ideker, Jr. | 43/139 |
| 5,402,598 A * | 4/1995 | Wade et al. | 43/139 |
| 5,722,111 A * | 3/1998 | Sowell et al. | 15/330 |
| 5,771,531 A * | 6/1998 | Swartz | 15/344 |
| 5,870,851 A * | 2/1999 | Shoemaker | 43/114 |
| 5,915,950 A | 6/1999 | Kleinhenz | 43/139 |
| 6,202,343 B1 | 3/2001 | Mah | 43/139 |
| 6,568,125 B2 | 5/2003 | Kleinhenz | 43/139 |
| 6,640,489 B1 | 11/2003 | Boulton | 43/139 |
| 6,651,380 B2 | 11/2003 | Wyers | 43/139 |
| 6,662,489 B2 | 12/2003 | Spiro et al. | 43/107 |
| D499,787 S | 12/2004 | Wyers | D22/122 |
| 6,871,445 B2 | 3/2005 | Bertani | 43/139 |
| 6,886,292 B2 | 5/2005 | Studer et al. | 43/113 |

* cited by examiner

*Primary Examiner*—Christopher P Ellis
(74) *Attorney, Agent, or Firm*—Z. Peter Sawicki; Westman, Champlin & Kelly, P.A.

(57) ABSTRACT

An invertebrate capturing device comprising a main body having an interior passage for connection with a vacuum source. The main body includes an invertebrate capturing opening and an invertebrate expulsion end for connection to a detachable container in which the invertebrates are captured. The detachable container is detached from the expulsion end, capped and thrown away with the captured invertebrate.

11 Claims, 2 Drawing Sheets

INVERTEBRATE CAPTURING DEVICE

CROSS-REFERENCE TO RELATED APPLICATION

The present application is based on and claims the benefit of U.S. provisional patent application Ser. No. 60/678,846, filed May 6, 2005, the content of which is hereby incorporated by reference in its entirety.

FIELD OF THE INVENTION

The present invention relates to insect capturing devices, in particular, it relates to an apparatus that uses a vacuum force for capturing insects.

*Harmonia axyridis* of the order Coleoptera of the family Coccinellidae—commonly known as the "Multicolored Asian Lady Beetle," the "Japanese Lady Beetle," the "Halloween Lady Beetle," etc.—was introduced in North America by the USDA as a biological control agent against detrimental soft-bodied insects, such as, aphids, mites, psyllids, and scales. Its relatively benign agricultural effects notwithstanding, because the beetle lacks natural predators in North America, its reproduction remains unchecked. After many releases during the twentieth century, the beetles have multiplied to epidemic proportions, being reported widely across the United States, and Canada. In autumn, as the temperature begins to drop and prey becomes scarce, the beetles typically swarm around heated buildings, entering through open doors and windows, crevices, cracks, and holes in the exterior. This is particularly problematic for homeowners because the beetles tend to work their way into attics, basements, and living spaces, sometimes numbering as many as 20,000 per house. Once inside, the beetles are extremely difficult to remove. In addition to this, the beetles are very annoying, aggregating on walls and windows, crawling around and on furniture, drapes, light fixtures, etc., flying and falling on people (and occasionally biting people), or, when agitated, spraying a yellowish malodorous chemical compound which can stain and may cause allergic reactions. The beetles reactivate during the early spring as they attempt to return to the out of doors in order to feed and reproduce. Despite the beetle's higher numbers in homes usually between the months of September and April, the beetles are more or less perennial pests. The recommended methods for eliminating this problem include various kinds of adhesives, pesticides, sweeping, blacklight traps, and preventative measures, such as, caulking apertures. All of these techniques are either impractical or imperfect.

The multi-colored Asian lady beetle is not the only insect pest which invades homes. Other such pests include for example boxelder bugs which in certain areas of the country invade homes in the fall and pose the same type of annoyance as the lady beetle. Boxelder bugs have an additional characteristic in that when crushed, the boxelder bug may leave a red stain. Other household pests include ants, other beetles, flying insects of various types and other invertebrates that may find their way into a home.

Vacuuming of the beetles and other pests is another method of attempting to remove the beetles. However, simple vacuuming of the beetles is not the most desirable method since the beetle's obnoxious odor may pervade the vacuum bag within the vacuum cleaner and the odor is consequently expelled from the vacuum cleaner's exhaust vents. In addition, beetles and other pests which are not damaged by being vacuumed, such as those pests with hard exoskeletons such as ants and other types of beetles, can crawl or fly out of the vacuum bag. Of course, the vacuum bag may be thrown out into the trash immediately after vacuuming the insects, but this is costly since a new vacuum bag needs to be placed within the vacuum cleaner.

Several types of devices used to vacuum household pests are described in the following U.S. patents:

| Inventor | Patent No. |
| --- | --- |
| Kleinhenz | 6,568,125 |
| Mah | 6,202,343 |
| Wyers | 6,651,380 |
| Boulton | 6,640,489 |
| Kleinhenz | 5,915,950 |

SUMMARY OF THE INVENTION

The present invention is an invertebrate capturing device for connecting to a vacuum for capturing invertebrates in a detachable container. The device of the present invention can be connected to a vacuum that has a vacuum connection. The device includes a main body having an interior passage and a vacuum connecting end for connection with the vacuum, an invertebrate capturing opening and an invertebrate expulsion end for connection to the disposable container. The vacuum connecting end, the invertebrate capturing opening and the invertebrate expulsion end all are in fluid connection through the interior passage.

DETAILED DESCRIPTION OF ILLUSTRATIVE EMBODIMENTS

Figure 1:
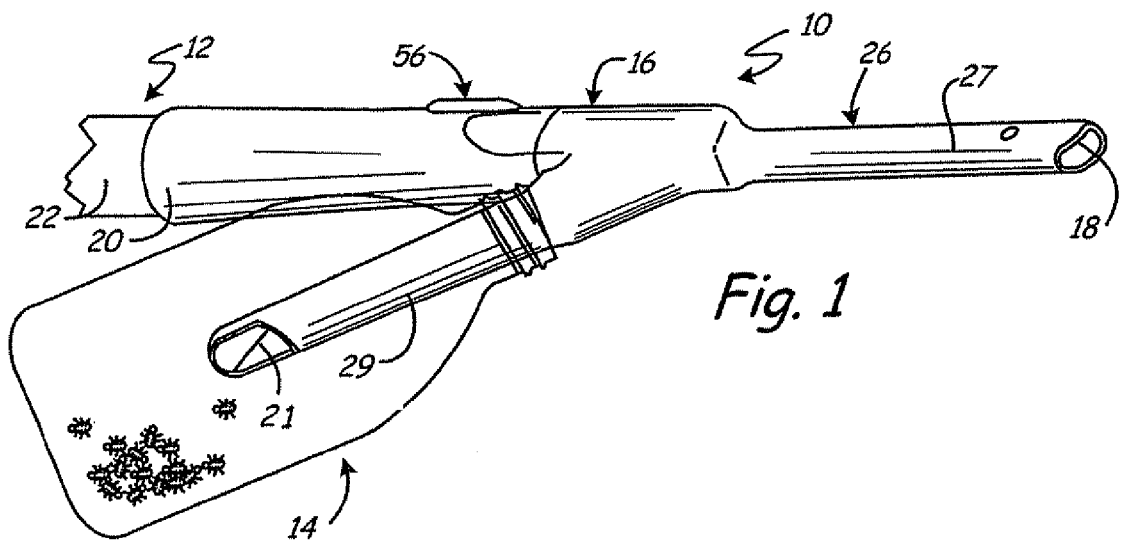
FIG. 1 is a perspective view of the present invention.
Figure 2:
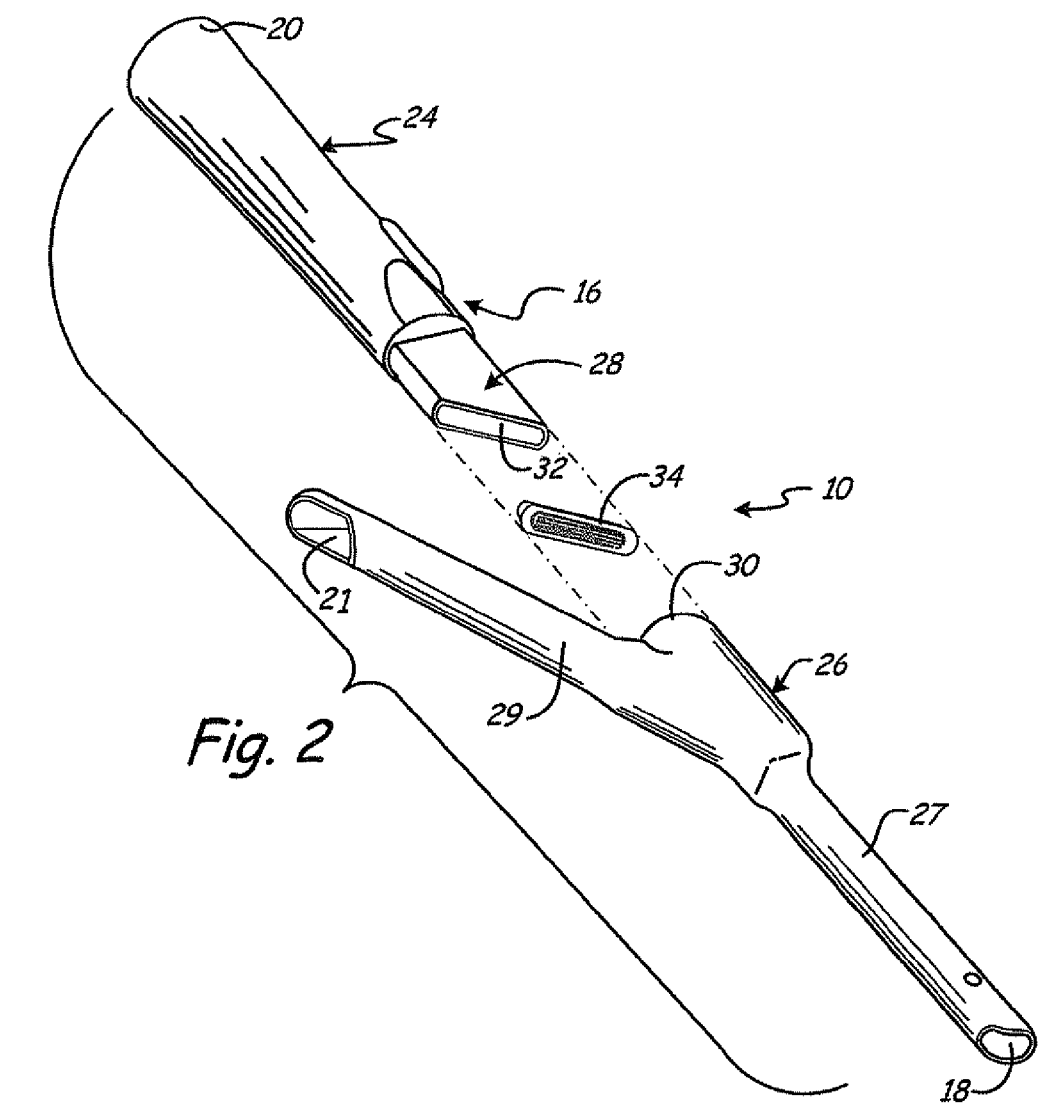
FIG. 2 is an exploded view of the present invention.

The device of the present invention is generally indicated at 10 in FIG. 1. The device 10 is for example preferably a separate and distinct device from that of a vacuum cleaner. The device 10 is connected to a conventional vacuum cleaner 20. A container 14 typically found in the home such as a plastic soda bottle is attached to the device for the capture and disposal of invertebrates. One advantage of the present invention is that it utilizes two components found in the typical home. This makes the present invention very economical to use.

By invertebrate is meant those arthropods that are commonly referred to as household pests and include such creatures as insects, arachnids, myriapods (centipedes and millipedes), and other invertebrate that may be found in or around a dwelling that are generally referred to, although incorrectly, as insects. The terms "invertebrate" and "insect" may be used in this application interchangeably and should be understood as having the same meaning.

The device 10 includes a main body 16 having an invertebrate capturing opening 18, and invertebrate expulsion opening 21 and a connecting end 20 of a size and shape for connecting the connecting end 20 to a tubular member 22 of a vacuum 12.

One purpose of the device of the present invention is convenience in both use and attachment to a conventional vacuum cleaner. Although the drawings only illustrate a portion of the conventional vacuum cleaner, it is understood that all standard vacuum cleaners can be used in connection with the device of the present invention. Typical vacuum cleaners such as vacuums referred to as "Shop Vacs" include tubular vacuum hoses to which various types of vacuum tools are attached. Such vacuum hoses often have rigid end portions. The end 20 of the device of the present invention is of a size and shape to frictionally fit over the rigid vacuum end of a Shop Vac. The amount of horsepower of the vacuum cleaner used with the device 10 is not particularly important since the device 10 will work with a wide range of horsepower.

Figure 3:
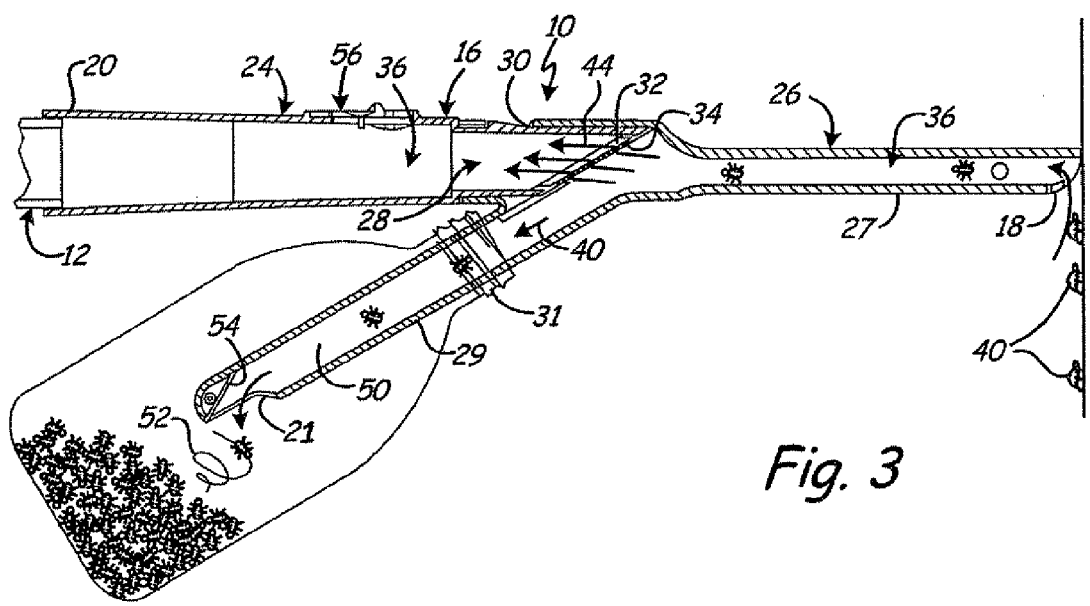
FIG. 3 is a sectional view of the present invention.

The device 10 is made of a suitable plastic that is made by injection molding or rotational molding or any other method of making plastic components. The main body 16 as best illustrated in FIG. 3 can be made, for ease of manufacture only, in two sections, a rearward section 24 and forward section 26. The device 10 can also be made as a unitary device or be made of more sections than two. The two sections illustrated in FIG. 3 have been made so that the device can be more economically manufactured.

The rearward section 24 includes a male forward member 28 that is insertable within an opening 30 of the forward section 26. The male forward end 28 has an opening 32 which is configured to accept a deflector screen 34 when the rearward section 24 and the forward section 26 are put together. The sections 24 and 26 can be secured to each other by either a snap fit, friction, adhesive or sonic welding or any other suitable method known for putting such components together.

The forward section 26 preferably includes an elongated nose 27 and an elongated tapered insert 29 with a passageway 50. The nose 27 includes the opening 18 at its distal end for entry of invertebrates. The tapered insert 29 is positioned within the container 14. An example of a suitable container 14 is a 20-oz plastic soda bottle. The insert section 29 is tapered such that an interior surface of the neck 31 of the soda bottle frictionally engages the exterior surface of the insert section 29 to retain the bottle on the insert section 29. The insert section 29 is sized and tapered such that it can accommodate a range of bottle openings for frictional fit. Although a friction fit between the container 14 and the insert section 29 is described, other types of connection methods such as threading or snap fit or other methods not described herein are also included within the scope of this invention.

One reason that a 20-oz plastic soda bottle is suggested is due to its availability. Such a bottle has sufficient wall strength to withstand the vacuum force created by a typical vacuum cleaner and can easily be capped once invertebrates are captured due to its threaded opening. However, other sizes of soda bottles are within the scope of the present invention. Bottles made of other materials (glass) or other types of containers may also be attached to the insert section 29. Such other containers should have walls of sufficient strength so the walls do not collapse under the vacuum force. Another feature of the plastic soda bottle is that it is easy to see the capture of the invertebrate and how many are captured. Depending on the personality of the user, this may provide entertainment value to the present invention.

As illustrated in FIG. 3, the main body 16 includes an air passage 36 which fluidly connects the connecting end 20 with the invertebrate capturing opening 18 and the invertebrate expulsion opening 21. When the male end 28 of the rearward section 24 is inserted within the opening 30 of the forward section 26, the deflector screen 34 is positioned at an acute angle.

As invertebrates 40 approach the opening 18 or the opening 18 is positioned towards the invertebrates 40, the invertebrates are sucked in by the vacuum into the passageway 36. As the invertebrates are transported by the vacuum, they approach the deflector screen 34 and hit the screen 34.

Figure 4:
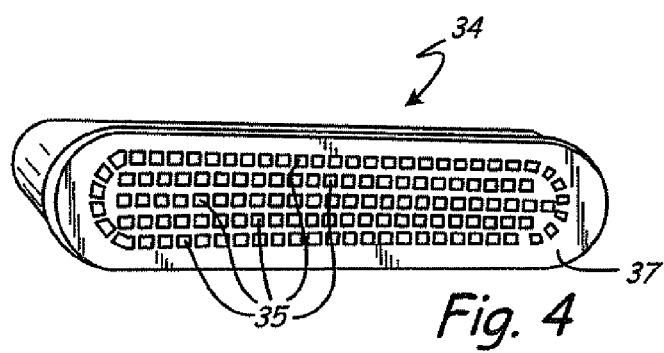
FIG. 4 is a perspective view of a screen of the device of the present invention.

As illustrated in FIG. 4, the deflector screen includes a plurality of apertures 35 in a major area 37. The apertures 35 permit air to flow in the passage 36 and therefore the vacuum force to exist while the front face area deflects invertebrate body(ies) into the passageway 50. The invertebrates are deflected and fall in the general direction of arrow 40 through the passageway 50.

The air flows through the passageway 36 as indicated by arrows 44 due to the suction being provided by the vacuum cleaner 12. The invertebrates hit the screen 34 and in part due to the angular position of the screen 34 in relation to the airflow, drop into the passageway 50 within the insert section 29. It is believed, although not fully understood, that a vortex 52 is created within the container 14. The vortex further aids in drawing the invertebrates into the container 14. A deflector plate 54 is positioned at a distal end of the insert section 29 to further deflect invertebrates into the container 14.

A suction manipulator 56 is positioned on the rearward section 24 and on a side of the screen 34 opposite that portion of the passage 36 through which invertebrates are being transported. The suction manipulator includes a slide that covers an opening to the passage 36. Moving the slide adjusts the vacuum within the passage 36. The suction manipulator 56 is used to adjust the vacuum for example if the vacuum is too strong which may result in the walls of the container collapsing.

In the case of ladybug beetles, a portion of the beetles when they hit the screen have their exoskeleton damaged or once the beetles fall within the disposable container may secrete their fetid secretion. However, since the plastic bottle is disposable, and may be easily disconnected from the insertion section (since it is a friction fit), the plastic bottle is simply recapped, permanently capturing the beetles, and then discarded. In the case of invertebrates which have a harder exoskeleton and which are not damaged by the deflection screen, such invertebrates in the case of being vacuumed directly into a vacuum (without the use of the present invention), can crawl out. However, the present invention provides a solution to such invertebrates that may crawl out by providing the capability of easily detaching the container and capping the container and disposing of it.

Although the present invention has been described with reference to preferred embodiments, workers skilled in the art will recognize that changes may be made in form and detail without departing from the spirit and scope of the invention.

What is claimed is:

1. An invertebrate capturing device for connecting to a vacuum apparatus having a vacuum connection that supplies a vacuum, the device comprising:

a beverage bottle consisting essentially of a single opening and a rigid neck portion extending therefrom in which the invertebrate are captured; and a main body having an interior passage and vacuum connecting end for connection with the vacuum connection, an invertebrate capturing opening and an invertebrate expulsion end portion for connection to the beverage bottle, wherein the vacuum connecting end, the invertebrate capturing opening and the invertebrate expulsion end are all in fluid connection via the interior passage, the invertebrate expulsion end having a tapered insert for insertion into the beverage bottle for detachably holding the beverage bottle, wherein the vacuum connecting end is sized and shaped to frictionally engage with the vacuum connection of the vacuum apparatus;

a deflector screen within the interior passage wherein the deflector screen is disposed at an acute angle with respect to the airflow within the interior passage, and positioned to deflect the invertebrate into the invertebrate expulsion end portion such that the invertebrate fall within the beverage bottle; and a deflector positioned at a distal end of the invertebrate tapered expulsion end portion to additionally deflect the invertebrate into the beverage bottle.

2. The device of claim 1 further including a vacuum adjusting mechanism for adjusting the vacuum within the interior passage.

3. An invertebrate capturing device comprising:

a conventional vacuum source providing a vacuum;

a main body having an interior passage in which the vacuum is maintained, the main body having an invertebrate capturing end and an invertebrate expulsion end, the invertebrate expulsion end portion having a tapered end portion;

a beverage bottle consisting essentially of a single opening and a rigid neck extending therefrom, the rigid neck with an inner surface, wherein an exterior surface of the tapered end portion of the invertebrate expulsion end portion of the main body is configured to frictionally engage the inner surface of the neck of the beverage bottle to attach the beverage bottle such that when invertebrate are collected and transported through the passage, such invertebrate are disposed within the detachable beverage bottle and the detachable beverage bottle may be detached by removing the tapered end portion from within the detachable beverage bottle;

a deflector screen within the interior passage wherein the deflector screen is disposed at an acute angle with respect to the airflow within the interior passage, and positioned to deflect the invertebrate into the invertebrate expulsion end portion such that the invertebrate fall within the beverage bottle; and a deflector positioned at a distal end of the invertebrate tapered expulsion end portion to additionally deflect the invertebrate into the beverage bottle.

4. The device of claim 3 and further including a vacuum adjusting mechanism located on the main body for adjusting the vacuum within the interior passage.

5. An invertebrate capturing device for connecting to a vacuum apparatus that provides a vacuum and has a vacuum suction end, the device comprising:

a main body having an interior passage and vacuum connecting end for connection with the vacuum suction end, an invertebrate capturing opening and an invertebrate tapered expulsion end portion, wherein the vacuum connecting end, the invertebrate capturing opening and the invertebrate tapered expulsion end portion are all in fluid connection via the interior passage;

a beverage bottle consisting essentially of a single opening and a rigid neck extending therefrom, the beverage bottle for frictionally and detachably engaging the invertebrate tapered expulsion end portion by insertion of the end portion within a rigid neck of the beverage bottle such that the beverage bottle is disengagable from the main body by removal of the tapered expulsion end portion from the neck of the beverage bottle;

a deflector screen within the interior passage wherein the deflector screen is disposed at an acute angle with respect to the airflow within the interior passage, and positioned to deflect the invertebrate into the invertebrate tapered expulsion end portion such that the invertebrate fall within the beverage bottle; and a deflector positioned at a distal end of the invertebrate tapered expulsion end portion to additionally deflect the invertebrate into the beverage bottle.

6. The device of claim 5 further including a vacuum adjusting mechanism for adjusting the vacuum within the interior passage.

7. The device of claim 1 wherein the vacuum connecting end is tubular and sized to frictionally engage an exterior surface of the vacuum connection.

8. The device of claim 3 wherein the main body further comprises a vacuum connecting end sized and shaped to frictionally engage a portion of the vacuum source.

9. The device of claim 8 wherein the vacuum connecting end is tubular and sized to frictionally engage an exterior surface of the portion of the vacuum source.

10. The device of claim 5 wherein the vacuum connecting end is sized and shaped to frictionally engage the vacuum suction end.

11. The device of claim 8 wherein the vacuum connecting end is tubular and sized to frictionally engage an exterior surface of the vacuum suction end.

* * * * *